United States Patent
Samdadiya et al.

(10) Patent No.: US 8,935,392 B2
(45) Date of Patent: *Jan. 13, 2015

(54) EVENT MANAGEMENT FOR HOSTED APPLICATIONS

(75) Inventors: Parag Samdadiya, Kirkland, WA (US); Peeyush Ranjan, Sammamish, WA (US); Jaideep M. Mirchandani, Hyderabad (IN)

(73) Assignee: Google Inc., Mountain View, CA (US)

(*) Notice: Subject to any disclaimer, the term of this patent is extended or adjusted under 35 U.S.C. 154(b) by 150 days.

This patent is subject to a terminal disclaimer.

(21) Appl. No.: 13/537,395

(22) Filed: Jun. 29, 2012

(65) Prior Publication Data
US 2012/0265805 A1 Oct. 18, 2012

Related U.S. Application Data

(63) Continuation of application No. 13/267,517, filed on Oct. 6, 2011, now Pat. No. 8,239,529.

(60) Provisional application No. 61/418,121, filed on Nov. 30, 2010.

(51) Int. Cl.
| | |
|---|---|
| G06F 15/173 | (2006.01) |
| G06F 15/16 | (2006.01) |
| G06F 3/00 | (2006.01) |
| G06F 11/30 | (2006.01) |
| G06F 11/34 | (2006.01) |
| G06F 11/32 | (2006.01) |

(52) U.S. Cl.
CPC .......... *G06F 11/302* (2013.01); *G06F 11/3476* (2013.01); *G06F 11/3466* (2013.01); *G06F 11/3006* (2013.01); *G06F 11/3072* (2013.01); *G06F 11/32* (2013.01); *G06F 2201/86* (2013.01)
USPC ............................. 709/224; 709/203; 715/700

(58) Field of Classification Search
None
See application file for complete search history.

(56) References Cited

U.S. PATENT DOCUMENTS

| | | |
|---|---|---|
| 5,617,561 A | 4/1997 | Blaauw et al. |
| 6,135,777 A | 10/2000 | Vogel |
| 6,230,198 B1 | 5/2001 | Dawson et al. |
| 6,405,318 B1 | 6/2002 | Rowland |
| 6,975,659 B2 | 12/2005 | Nagano et al. |
| 7,035,879 B2 | 4/2006 | Shi et al. |

(Continued)

OTHER PUBLICATIONS

'How to View and Manage Event Logs in Event Viewer in Windows XP,' Article ID: 308427, Last Review: May 7, 2007—Revision 3.5, reprinted from http://support.microsoft.com/kb/308427 on Oct. 6, 2011, 4 pages.

(Continued)

*Primary Examiner* — Ranodhi Serrao
(74) *Attorney, Agent, or Firm* — Fish & Richardson P.C.

(57) ABSTRACT

At a server system, event data is received that was sent over a network to the server system. The event data reflects one or more application events generated by at least one hosted application. The hosted application is executed on one or more servers and being accessible by a user over a network using a user client device. The event data is stored at the server system. A request to view information regarding events generated by the hosted application is received at the server system and from an administrator client device over a network. The stored event data is received. At the administrator client device and based on the retrieved event data, a display of information regarding application events is generated by the hosted application.

29 Claims, 8 Drawing Sheets

(56) References Cited

U.S. PATENT DOCUMENTS

| | | | |
|---|---|---|---|
| 7,149,308 B1 | 12/2006 | Fruehauf et al. | |
| 7,155,514 B1 | 12/2006 | Milford | |
| 7,200,582 B1 | 4/2007 | Smith | |
| 7,284,054 B2 | 10/2007 | Radhakrishnan | |
| 7,437,484 B2 | 10/2008 | Auriemma et al. | |
| 7,490,775 B2 | 2/2009 | Biderman | |
| 7,499,958 B1 | 3/2009 | Ionescu | |
| 7,562,139 B2 | 7/2009 | Wang et al. | |
| 7,788,274 B1 | 8/2010 | Ionescu | |
| 7,970,946 B1 | 6/2011 | Djabarov et al. | |
| 8,086,698 B2 | 12/2011 | Rakowski et al. | |
| 8,103,740 B1 | 1/2012 | Abramov et al. | |
| 2001/0004746 A1 | 6/2001 | Wright | |
| 2002/0078256 A1 | 6/2002 | Gehman et al. | |
| 2003/0174842 A1 | 9/2003 | Challener | |
| 2003/0220940 A1 | 11/2003 | Futoransky et al. | |
| 2004/0128528 A1 | 7/2004 | Poisner | |
| 2004/0143569 A1 | 7/2004 | Gross et al. | |
| 2005/0028171 A1* | 2/2005 | Kougiouris et al. | 719/318 |
| 2005/0050112 A1 | 3/2005 | Chandrasekaran | |
| 2005/0094661 A1 | 5/2005 | Seligman et al. | |
| 2005/0108297 A1 | 5/2005 | Rollin et al. | |
| 2005/0120091 A1 | 6/2005 | Casais et al. | |
| 2005/0208803 A1 | 9/2005 | Rohatgi et al. | |
| 2005/0210270 A1 | 9/2005 | Rohatgi et al. | |
| 2006/0059530 A1 | 3/2006 | Spielman et al. | |
| 2006/0106879 A1 | 5/2006 | Zondervan et al. | |
| 2006/0109113 A1 | 5/2006 | Reyes et al. | |
| 2006/0147043 A1 | 7/2006 | Mann et al. | |
| 2006/0155773 A1 | 7/2006 | Drouet et al. | |
| 2006/0280207 A1 | 12/2006 | Guarini et al. | |
| 2007/0033569 A1* | 2/2007 | Davidson et al. | 717/103 |
| 2007/0067309 A1 | 3/2007 | Klein et al. | |
| 2007/0110070 A1 | 5/2007 | Chang et al. | |
| 2007/0244571 A1 | 10/2007 | Wilson et al. | |
| 2008/0092638 A1 | 4/2008 | Brenneman et al. | |
| 2008/0104042 A1 | 5/2008 | Gutt et al. | |
| 2008/0320552 A1 | 12/2008 | Kumar et al. | |
| 2009/0055838 A1 | 2/2009 | Sedukhin et al. | |
| 2010/0058165 A1 | 3/2010 | Bhattacharya et al. | |
| 2010/0100724 A1 | 4/2010 | Kaliski | |
| 2010/0318989 A1 | 12/2010 | Dureau et al. | |

OTHER PUBLICATIONS

"The Ins and Outs of System Logging Using Syslog," SANS Institute InfoSec Reading Room, reprinted from http://www.sans.org/reading_room/whitepapers/logging/ins-outs-system-logging-syslog_1168 on Oct. 6, 2011, 53 pages.

International Search Report issued in PCT/US2011/062436 dated Apr. 4, 2012, 2 pages.

Written Opinion of the International Searching Authority dated Apr. 4, 2012, 5 pages.

* cited by examiner

| Audit Log | | | |
|---|---|---|---|
| Filtering Options ▶ | | Graphs  Alerts | Export ▶ |
| Event Type | Action | User | Date/Time |
| {eventtype} | jaideepm created in {Organization Name} | {admin} | 12:24 pm 11/01/2010 |
| User | Krishnai in New York | johndoe | 12:24 pm 11/01/2010 |
| Organization | Tokyo created under New York | {admin} | 12:24 pm 11/01/2010 |
| User | Bhalverson renamed to bcampbell in Tokyo | johndoe | 12:24 pm 11/01/2010 |
| Setting | Calendar sharing setting changed | johndoe | 12:24 pm 11/01/2010 |
| Setting | Engineers created under New York | {admin} | 12:24 pm 11/01/2010 |
| User | johnd renamed johnc in Tokyo | {admin} | 12:24 pm 11/01/2010 |

FIG. 4

EVENT MANAGEMENT FOR HOSTED APPLICATIONS

CROSS-REFERENCE TO RELATED APPLICATIONS

This application is a continuation of U.S. application Ser. No. 13/267,517, filed Oct. 6, 2011, now U.S. Pat. No. 8,239,529, which is a non-provisional of U.S. Application No. 61/418,121, filed Nov. 30, 2011. The contents of both applications are incorporated herein by reference in their entirety.

TECHNICAL FIELD

This document relates to hosted applications.

BACKGROUND

Hosted, or cloud-based applications, refer to off-site or remote applications that are provided to users, often across network connections. The applications, for example, may be developed and provided by the entity hosting the application, may be developed by the entity employing the application, or may be developed by a third party separate from those two entities. A hosted application may be executed in a data center, and accessed by a client application across a network, such as the Internet. Some hosted applications may be web-based applications, which may be accessed across a network using a web browser.

SUMMARY

In one aspect, a method includes receiving, at a server system, event data that was sent over a network to the server system. The event data reflects one or more application events generated by at least one hosted application. The hosted application is executed on one or more servers and being accessible by a user over a network using a user client device. The method further includes storing the event data at the server system. The method further includes receiving, at the server system and from an administrator client device over a network, a request to view information regarding events generated by the hosted application. The method further includes retrieving the stored event data. The method further includes causing, at the administrator client device and based on the retrieved event data, a display of information regarding application events generated by the hosted application.

Implementations can include any, all, or none of the following features. The application events may be associated with an enterprise. Storing the event data may include storing the event data in association with the enterprise. Receiving, at the server system and from the administrator client device over a network, the request to view information regarding application events generated by the hosted application can include receiving a request to view information regarding application events associated with the enterprise. Retrieving the stored event data can include retrieving event data stored in association with the enterprise. Causing, at the administrator client device and based on the retrieved event data, a display of information regarding application events generated by the hosted application can include causing a display of information regarding application events associated with the enterprise. The application events may be generated by multiple hosted applications that are associated with the enterprise. The application events may be generated as a result of the user interacting with the hosted application. The user may be associated with the enterprise. Storing the event data may include storing the event data in association with the user. The application events may be associated with a domain registered with the server system. Storing the event data can include storing the event data in association with the domain. Receiving, at the server system and from the administrator client device over a network, the request to view information regarding events generated by the hosted application may include receiving a request to view information regarding events associated with the domain. Retrieving the stored event data may include retrieving event data stored in association with the domain. Causing, at the administrator client device and based on the retrieved event data, a display of information regarding events generated by the hosted application may include causing a display of information regarding events associated with the domain. The events may be generated in response to a change of state of the hosted application. The change in state may be a result of user interaction with the hosted application. The method may further include enabling a user of the administrator client device to filter the display of information regarding application events based on attributes of the application events. The attributes may include one or more of event type, identity of event, location of user that caused event to occur, time event occurred, or a keyword related to events. The method may further include enabling a user of the administrator client device to configure alerts based on patterns of application events. One of the patterns may include access to the hosted application from outside a particular geography. The method may further include enabling a user of the administrator client device to display event trends based on the event data. The display of information regarding application events generated by the hosted application may include a graph showing event trends. The graph showing event trends may include a graph showing a number of selected application events occurring over a period of time.

In one aspect, a system includes an application host configured to execute a hosted application that is accessible by a client system over a network and that generates application events. The system further includes a user client device configured to access the hosted application over the network. The system further includes an event management server system configured to receive event data that was sent over a network to the event management server system, the event data reflecting one or more application events generated by the hosted application. The event management server system is further configured to store the event data. The event management server system is further configured to receive, from an administrator client device over a network, a request to view information regarding events generated by the hosted application. The event management server system is further configured to retrieve the stored event data. The event management server system is further configured to cause, at the administrator client device and based on the retrieved event data, a display of information regarding application events generated by the hosted application. The system further includes the administrator client device configured to send, to the event managements system over the network, the request to view information regarding events generated by the hosted application and to display the information regarding application events generated by the hosted application.

Implementations can include any, all, or none of the following features. The application events may be associated with an enterprise. The event management server system may be configured to store the event data in association with the enterprise. The event management server system may be configured to receive, from the administrator client device over the network, a request to view information regarding application events associated with the enterprise. The event management server system may be configured to retrieve event data stored in association with the enterprise. The event management server system may be configured to cause, at the administrator client device and based on the retrieved event data, a display of information regarding application events associated with the enterprise. The application events may be generated by multiple hosted applications that are associated with the enterprise. The application events may be generated as a result of the user interacting with the hosted application. The user may be associated with the enterprise. The event management server system may be configured to store the event data in association with the user. The application events may be associated with a domain registered with the event management server system. The event management server system may be configured to store the event data in association with the domain. The event management server system may be configured to receive, from the administrator client device over a network, a request to view information regarding events associated with the domain. The event management server system may be configured to retrieve event data stored in association with the domain. The event management server system may be configured to cause, at the administrator client device and based on the retrieved event data, a display of information regarding events associated with the domain. The events may be generated in response to a change of state of the hosted application. The change in state may be a result of user interaction with the hosted application. The administrator client device may be configured to allow a user of the administrator client device to filter the display of information regarding application events based on attributes of the application events. The attributes may include one or more of event type, identity of event, location of user that caused event to occur, time event occurred, or a keyword related to events. The event management server system may be configured to enable a user of the administrator client device to configure alerts based on patterns of application events. One of the patterns may include access to the hosted application from outside a particular geography. The administrator client device may be configured to allow a user of the administrator client device to display event trends based on the event data. The display of information regarding application events generated by the hosted application may include a graph showing event trends. The graph showing event trends may include a graph showing a number of selected application events occurring over a period of time Various implementations of the subject matter described here may provide one or more of the following advantages. In one or more implementations, storing event data for multiple hosted applications associated with a single user can provide to an administrator a single point of event management for hosted applications. In one or more implementations, enterprise users like administrators and analysts may be able to obtain insight (including detailed analytics) into login activities and application usage of user in the enterprise.

The details of one or more implementations are set forth in the accompanying drawings and the description below. Other features will be apparent from the description and drawings, and from the claims.

DESCRIPTION OF DRAWINGS

FIG. 4 is an illustration showing an example of a graphical user interface for displaying events.

DETAILED DESCRIPTION

In various implementations, a single user or enterprise may have accounts with one or more hosted, or cloud-based, applications from one or more hosted application providers, and the applications may produce different types of application events. An event management system can collect those events over a network from the hosted applications and store the events together in a data repository.

The events can be presented together in reports to the user or an administrator to monitor the events generated by hosted applications. The reports can be filtered, or organized in graphical format such as charts or graphs.

In some implementations, such a system may provide administrators of an enterprise with insight into login activities and application usage of their users. For instance, if an administrator is worried about certain accounts being compromised, he or she may use the system to determine the geographic locations from which the account was accessed. As other examples, the administrator may determine whether any login activity occurred after a particular user device was lost, how many email attachments with .exe extension are being downloaded, and the peak hours for online activity for my users in a particular business unit.

Figure 1:
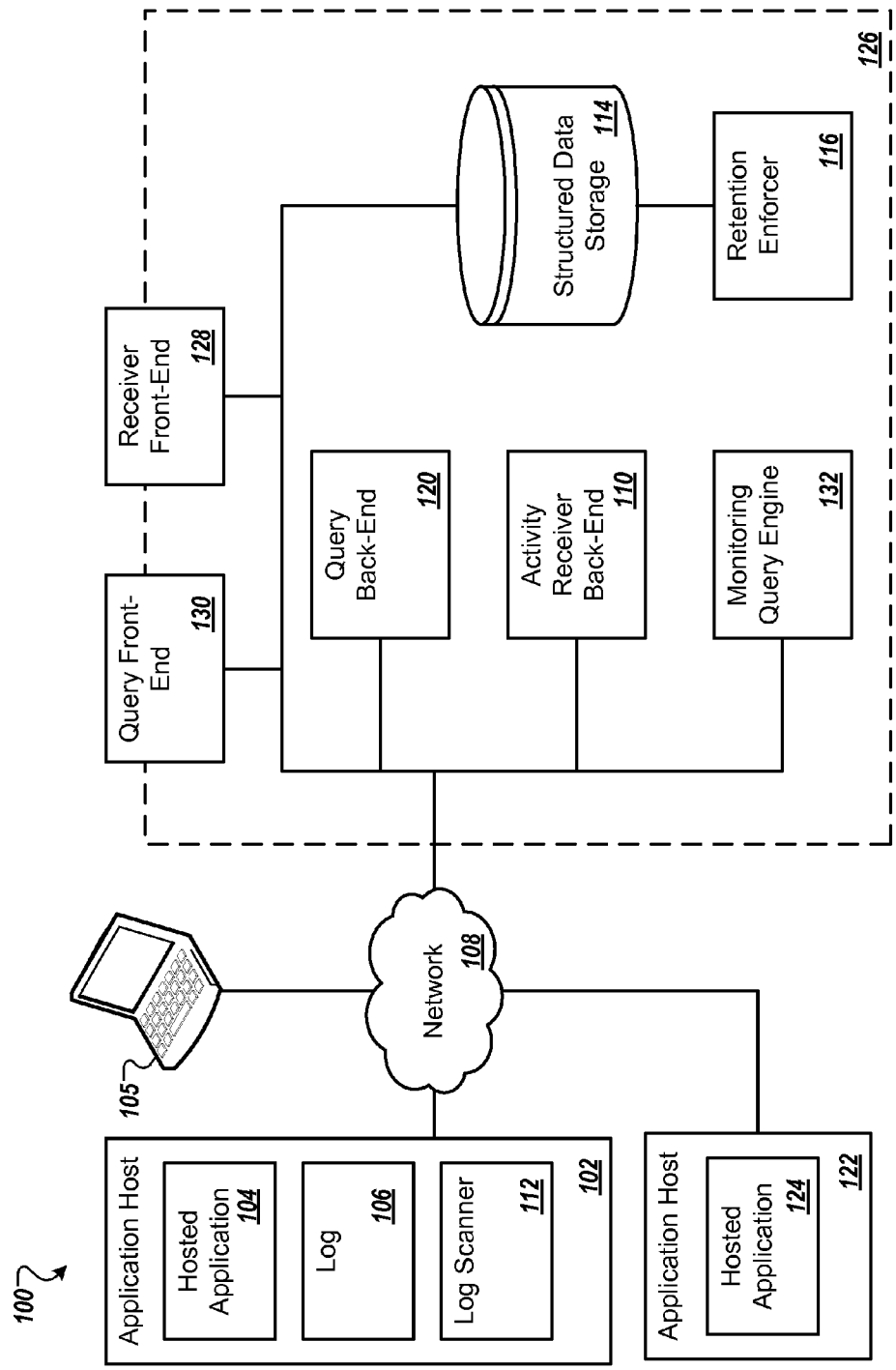
FIG. 1 is a block diagram showing an example of a system for storing events generated by hosted applications.

FIG. 1 is a block diagram showing an example of a system 100 for storing events from hosted applications. In the system 100, a remote event management system 126 can provide a unified point of management for hosted application events and can provide aggregation and summary information about hosted application events. The system 100 can include an application host 102, a user client device 105, and the remote event management system 126.

Figure 8:
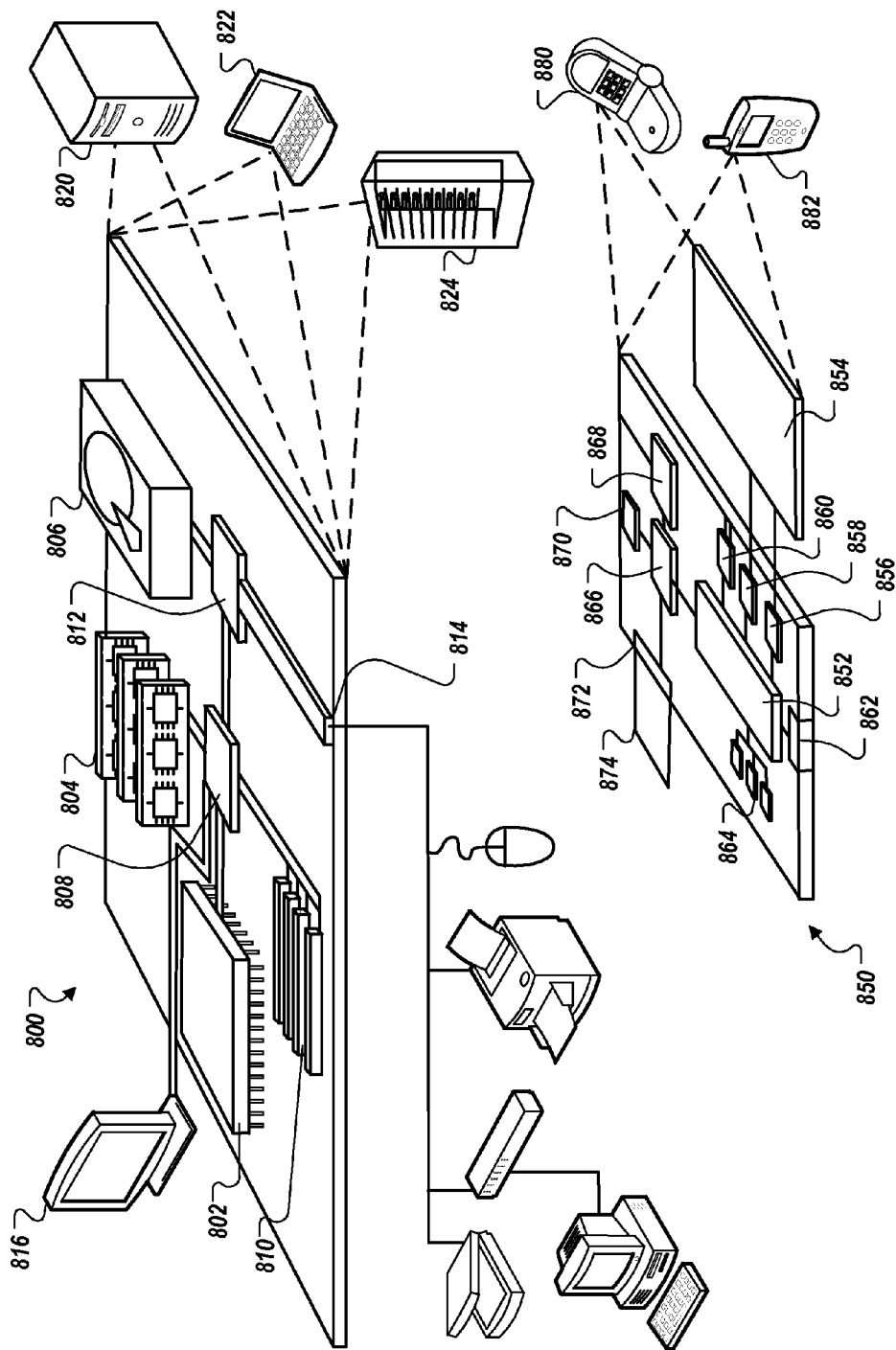
FIG. 8 shows an example of a computing device and a mobile computing device that can be used in connection with computer-implemented methods and systems described in this document.

The application host 102, the client device 105, and/or the remote event management system 126 can be implemented using a computing device, such as the computing device 800 or the mobile device 850 described with respect to FIG. 8. The application host 102, the client device 105, and/or the remote event management system 126 can communicate via a network 108, such as the Internet, using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only two application hosts 102 and 122, a single client device 105, and a single remote event management system 126 are shown, there can be more or fewer application hosts 102 and 124, client devices 105, and/or the remote event management systems 126, or other services or devices.

In some implementations, the application host 102 and the remote event management system 126 may be on the same local network, with the application host 102 and the remote event management system 126 accessible to other computing devices through an external network such as the Internet. In some implementations, the remote event management system 126 may be implemented in a datacenter, and the application host 102 may be implemented in the same or a different data center.

The application host 102 implements a hosted application 104 by executing instructions on one or more processing devices. The hosted application 104, sometimes called a remote application, cloud application, or web application, can display a user interface to a user at the client device 105. Example hosted applications 104 can include, but are not limited to, e-mail web clients, document editors, account managers, and data storage clients. The hosted application 104 can create application events, for example, in response to a change in state of the hosted application 104 (e.g., reception of new email, edits to a document, change to a setting, creation or deletion of a data object, expense report approval, credit to an employee account, or disk usage near 90% of a quota). The change of state may occur, for instance, as a result of user input or interaction with the hosted application 104, or internal processing of the hosted application 104. The event data object can include information about the corresponding event.

The events can be stored at the remote event management system 126. In some implementations, event data objects created by the hosted application 104 can be transmitted by the application host 102, across the network 108, to an activity receiver back-end 110 in the remote event management system 126. For example, if the application host 102 is on the same network as the remote event management system 126 (for example, if both are hosted in the same datacenter), the application host 102 may send the event objects directly to the activity receiver back-end 110, for example, using a remote procedure call (RPC). In some of these examples, the event data object to the activity receiver back-end 110 can have the following format:

```
struct Activity {
    Int64 time_stamp;      //timestamp when event occurred
    Int64 user_id;         //user that caused event to occur
    string ip_address;     //IP address of the user when the event occured
    string event_type;     //event_type descriptor,
                           e.g. "expense_report_approved,"
                           //"disk_quota_exceeded"
    struct Parameters{     //provides additional information about event
        string name;       //data descriptor, e.g. "expense_amount,"
                           "employee_org"
        string value;      //value of data, e.g. "122.32 USD,"
                           "engineering"
    }
};
```

As another example, as described further below, the application host 102 may send the event objects to an activity receiver front-end 128 using, for example, Hypertext Transfer Protocol (HTTP), and the activity receiver front-end 128 may then forward the event object to the activity receiver back-end 110 using, for example, an RPC. The event objects may be sent to the activity receiver front-end 128 when the application host 102 is not implemented on the same network as the remote event management system 126. In this case, for example, the application host 102 may communicate with the activity receiver front-end 128 across the Internet.

Additionally or alternatively, the application host 102 and/or the hosted application 104 can store the event to a log 106 that resides on the application host 102. A log scanner 112 in the application host 102 can request the contents of the log 106 from the application host 102. Once the log scanner 112 receives the event data, the log scanner 112 can send the event data objects to the activity receiver back-end 110 through the network 108. In some implementations, low volume event data objects can be sent by the application host 102 directly to the activity receiver back-end 110, and high volume event data objects can be stored in the log 106 for batch reporting. For example, events can be stored in the log 106 when the events are generated in such a volume that directly sending the event objects to the activity receiver front-end 128 or the receiver back-end 110 may overwhelm the processing capabilities of the receiver front-end 128 or the receiver back-end 110. Alternatively, or additionally, events can be stored in the log 106 to reduce or minimize the network overhead needed to send an RPC or other call to the receiver front-end 128 or the receiver back-end 110. Although the log scanner 112 is shown as a component of the application host 102, log scanners may be incorporated in the remote event management system 126, the second application host 122, or any application host that includes a log.

The activity receiver back-end 110 can store received event data objects in a structured data storage 114. The structured data storage 114 can store data and metadata to support, among other functions, responses to queries on the stored data. A retention enforcer 116 can manage data retention polices for the event data objects stored in the structured data storage 114.

The activity receiver back-end 110 can associate event data objects with a user, domain, administrator, or other actor or classification. An authentication system can provide actor identification (user name, permissions, role, etc.) In some implementations, the application host 102 can also use the authentication system to control access to the hosted application 104 or to associate users of the hosted application 104 with users in the authentication system.

For example, an administrator can register an Internet domain name with the authentication system 118 for an enterprise such as a business or organization. The administrator can also add or identify users associated with the enterprise in the authentication system. Each user may be assigned a domain specific login and password that the user can use to login to the authentication system. Once authorized, the authentication system can provide an application host with user data, such as an encrypted character string, identifying a user. The application host can then incorporate this identifying data in event data objects that are submitted to the remote event management system 126. This identity data can be used, for example, to store the event data object in association with the enterprise and/or the user.

An administrator of the organization that employs the hosted application 104, using an administrator client device (e.g., the client device 105 or another client device) can access the remote event management system 126 to view reports about hosted application events. The administrator can use an application, such as a web browser, to send a request for such a report through the network 108 to a query front-end 130. In some implementations, the request from the administrator's user terminal to the query front-end 130 can be a uniform resource identifier (URI). For example, a URI such as "http://server/task/volume/x097basd-f08/5s6gv21ed6w0f4156ed6w2s03c51fv56?start_time_usec=1286781826078000&end_time_use c=1286781826099000" may be sent, where x097basd-f08 is an obfuscated authentication identification string, 5s6gv21ed6w0f4156ed6w2s03c51fv56 is the application identification string for the hosted application 104, and the start_time_usec and end_time_usec parameters identify the start time and end time of event data objects to return, respectively.

The query front-end 130 can parse the request and issue to a query back-end 120 an RPC that identifies the requested data. The query back-end 120 can authenticate the user issuing the request and determine whether the user issuing the request has the appropriate permissions to access the requested data (for example, using an authentication system). If the user is authenticated and authorized, the query back-end 120 can then issue the query to the structured data storage 114. The query issued to the structured data storage 114 can be in the structured query language (SQL) or another language appropriate to the storage format of the structured data storage 114. The data received from the structured data storage 114 by the query back-end 120 can be returned to the query front-end 130 in response to the RPC, and the query front-end 130 can cause a display of information regarding events, for example, by returning the data to the administrator's client device for display as part of the report.

In some examples, the requested event data objects can be returned in a serialized data format such as the extensible markup language (XML) or the JavaScript Object Notation (JSON). An example JSON response is listed here:

cation from an authentication system. As such, in some implementations, all event data objects associated with the user (and/or the user's associated organization) may be queried from the query front-end 130, even if the application host 102 and the second application host 122 may not directly communicate with each other to share event data objects.

Additionally or alternatively, event data objects may be submitted by other application hosts and/or applications to the remote event management system 126 through the activity receiver front-end 128, which can forward the event data object to the activity receiver back-end 110, where it can be handled like other received event data objects. For example, an application host owned and maintained by an entity different than the one that owns and maintains the remote event management system 126 may provide hosted applications to users and manage events in a system owned by that entity. However, as a customer service feature to customers that also use the hosted application 104, the separate system may submit event data objects to the remote event management system 126 so that the users of the remote system may collect all of their event data objects in the remote event management system 126. Similarly, the separate system may query the remote event management system 126 for event data objects related to a shared user so that the remote system has access

```
{"data":{"activity":[{"activityId":{"timeUsec":"1286781826078000","uniqQualifier
":"6072391031225616130"},"applicationId":"5s6gv21ed6w0f4156ed6w2s03c51
fv56","customerId":" x097basd-
f08"},"eventType":"GRANT_ADMIN_value\u003example@example.domain.net
}","{name\u003dOLD_VALUE,
value\u003dtrue}","{name\u003dNEW_VALUE,
value\u003dfalse}"]},{"activityId":{"timeUsec":"1286365471431000","uniqQualifier
":"-
1664164883828223968","applicationId":"5s6gv21ed6w0f4156ed6w2s03c51fv56
","customerId":" x097basd-
f08"},"eventType":"CHANGE_LAST_NAME","actor":{"callerType":"USER","email
":"example@example.domain.net"},"value\example@example.domain.net}",
"{name\u003dOLD_VALUE, value\u003dnew last for
example1}","{name\u003dNEW_VALUE, value\u003dnew last name for
example1}"]},{"activityId":{"timeUsec":"1286365471431000","uniqQualifier":"
7553516232121738665","applicationId":"5s6gv21ed6w0f4156ed6w2s03c51fv56
","customerId":" x097basd-
f08"},"eventType":"GRANT_ADMIN_value\u003example@example.domain.net
}","{name\u003dOLD_VALUE,
value\u003dfalse}","{name\u003dNEW_VALUE,
value\u003dtrue}"]},{"activityId":{"timeUsec":"1286364101154000","uniqQualifier
":"-
7244721319015740060","applicationId":"5s6gv21ed6w0f4156ed6w2s03c51fv56
","customerId":" x097basd-
f08"},"eventType":"CHANGE_LAST_NAME","actor":{"callerType":"USER","email
":"example@example.domain.net"},"value\u003example@example.domain.net
}","{name\u003dOLD_VALUE,
value\u003dexample3}","{name\u003dNEW_VALUE, value\u003dnew last for
example1}"]},{"activityId":{"timeUsec":"1286364000001000","uniqQualifier":"-
4633652095305369397","applicationId":"5s6gv21ed6w0f4156ed6w2s03c51fv56
","customerId":" x097basd-
f08"},"eventType":"CHANGE_LAST_NAME","actor":{"callerType":"USER","email
":"example@example.domain.net"},"value\example@example.domain.net}",
"{name\u003dOLD_VALUE, value\u003dTotla}","{name\u003dNEW_VALUE,
value\u003dnew last
name}"]}],"tokenPagination":{"nextPageToken":"A:1285668291687000:-
5846461997070636458: 5s6gv21ed6w0f4156ed6w2s03c51fv56: x097basd-
f08"}}}
```

A second application host 122 hosting a second hosted application 124 may be used by the same or different user at the client device 105 or another terminal. The second hosted application 124 may create event data objects that are also stored in the remote event management system 126. The event data objects created by the hosted application 104 and the second hosted application 124, stored in the structured data storage 114, may both be associated with the same user or domain (and/or organization), based on the user's authentito all event data objects related to the user. These queries can be received through the query front-end 130 and passed to the query back-end 120, where they can be handled like other queries and replied to through the query front-end 130.

For example, the hosted application 104 may provide to the client device 105 a user interface for editing documents. The user may edit and save a document through the hosted application 104, generating an event data object that is submitted by the hosted application 104 to the remote event management system 126. Later, the user may log onto a computer with a local document editing application, access the document, and generate a second event data object. The event data object can be submitted to the remote event management system 126 through a receiver front-end 128 and eventually stored in the structured data storage 114. Both of these events may be included in a response to a query submitted through the query back-end 120 or the query front-end 130.

In some implementations, the system 100 may be used by an enterprise to manage all of the application events created as a result of users using the hosted applications employed by the enterprise and/or created from a change in state of those hosted applications. In some implementations, business intelligence can be gathered and generated from the event data objects by allowing an enterprise administrator running various filtering, grouping, and aggregation, and trend queries for event data through the query back-end 120 and/or the query front-end 130. Additionally, monitoring queries can be used to identify abnormal patterns of events and alert can be sent to an enterprise administrator about any such abnormal patterns in their enterprise. Some of these abnormal patterns may be defined by the enterprise administrator (e.g., no employees work outside of a particular country or state, so any requests for access to data originating from another country or state would be abnormal, and a query can be created, for example, to generate an alert when any employee logs in from outside the United States.) Some of the abnormal patters may be applied to any enterprise (e.g., storage of data files with virus signatures.)

Some or all of the monitoring queries can be processed, in some examples, by a monitoring query engine 132. The monitoring query engine can generate, store, and submit to the query back-end 120 queries that identify alert conditions (e.g., events of interest stored in the structured data storage 114) and can generate alerts when those conditions are found. In one example, the monitoring query engine 132 can search the structured data storage 114 (for example, by submitting a search query to the query back-end 120) for events of a particular type (e.g., "disk_quota_exceeded.") The monitoring query engine 132 can perform this search according to a fixed schedule, when the query back-end 120 and structured data storage 114 have free processing resources, or according to another schedule. Similarly, a hosted application can process monitoring queries by submitting the queries to the query front-end 130.

Additionally or alternatively, the activity receiver back-end 110 can monitor for alert conditions (e.g., receiving an event of interest.) For example, the activity receiver backend 110 can contain a rule-set that defines alert conditions, including a rule identifying any reception of a "disk_quota_exceeded" as an alert condition.

Described here are four example monitoring queries. In other configurations, these monitoring queries can be processed by other components, and other monitoring queries are possible.

In a first example, an enterprise administrator can create a monitoring query in the monitoring query engine 132. The administrator can identify geographic regions in which enterprise members live and work, and can request an alert when a login attempt is received from outside those regions. The monitoring query engine 132 can generate a rule-set that identifies clues in a login attempt, such as IP address and location data provided by a client device, to determine if the login attempt originated outside the enterprise's regions. The login attempt may be permitted or halted, and an alert message can be generated.

In a second example, an administrator of the remote event management system 126 can create a monitoring query in the monitoring query engine 132 to monitor data files for virus infestation. The monitoring query engine 132 can submit any message containing a data file to a virus recognition system. If no virus is found, the activity receiver back-end 110 can process the message as usual. If a virus is found, the activity receiver back-end 110 can quarantine the received message, and generate an alert message.

In a third example, the monitoring query engine 132 can process daily monitoring queries that report failed or prevented operations. Such operations can include, but are not limited to failed login attempts, quarantined viral data files, and attempted access to forbidden websites or data. The monitoring query engine 132 can process a query, for a particular enterprise, that searches for any failed or prevented operations associated with that particular enterprise in the last day. If any operations are found, and the monitoring query engine 132 can generate an alert message summarizing or detailing those operations.

In a fourth example, the monitoring query engine 132 can perform a "suspect user activity" query. An enterprise administrator can define in the monitoring query engine 132 a complex set of rules that identify suspect activity in the administrator's enterprise. This rule-set may be complex and constantly evolving based on the state of the enterprise as a whole. For example, the rule-set can include:
  a. Two concurrent logins from different continents.
  b. Account access from a public site in an unexpected location (may be inferred based on a combination of current location of the access and expected location patterns of the user such as travel plans.)
  c. Content patterns (e.g., email containing multiple instances of suspicious data like social security numbers, credit card numbers and documents labeled "confidential" sent to an outside domain; unexpected access to long dormant data; and/or multiple attempts to access forbidden data or websites).

If any such activity is found, monitoring query engine 132 can generate an alert message.

Once an alert message is created, it can be communicated to a user such as an enterprise administrator. In some implementations, the user can associate one or more communication channels (e.g., an email address, a phone number) with one or more alerts and/or alert types. The remote event management system 126 can transmit the alert message through the selected communication channels within a short period of time (e.g., near real-time).

Figure 2:
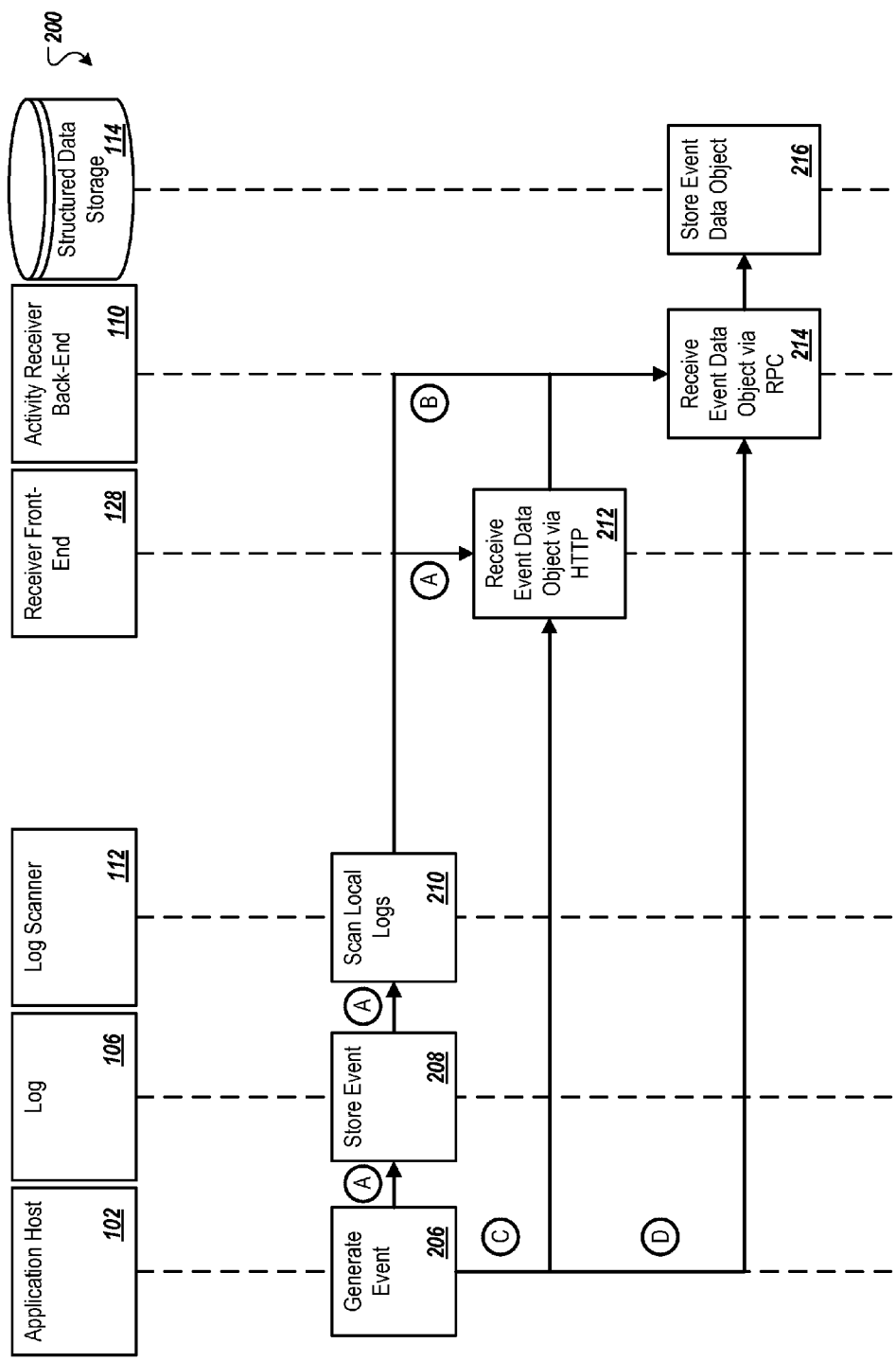
FIG. 2 is a swim-lane diagram showing an example of a process for storing events generated by hosted applications.

FIG. 2 is a swim-lane diagram showing an of a example process 200 for storing events generated by hosted applications. The process 200 can be performed by, for example, systems such as the application host 102 and the remote event management system 126. Therefore, the description that follows uses the system 100 as the basis of an example describing the system for clarity of presentation. However, another system, or combination of systems, may be used to perform the process 200.

The application host 102 generates an event (206). In some implementations, user login activity itself can be an event. The application host 102 can present the hosted application 104 to the user, and user interaction with the hosted application 104 can cause hosted application 104 to generate an event. Alternatively, or additionally, the hosted application 104 may generate an event as a result of the application's internal processing.

The event can be stored to the remote event management system 126 according to at least four process paths. The type of process path used may depend on, for example, the configuration of the system 100, particularly the security policies of the remote event management system 126, the types of network connectivity between the application host 102 and the remote event management system 126, and the frequency at which events are generated. Process path A may be used, for example, when the application host 102 generates a high volume of events and the log 106 is on the same computer device as the hosted application 104. The process path B may be used, for example, when the log scanner 112, whether or not on the same computer device as the hosted application 104 or the activity receiver back-end 110, can communicate with the activity receiver back-end 110 across a local network or internal data bus. Process path C may be used, for example, when the application host 102 produces a low volume of events and the application host 102 communicates with the remote event management system 126 through a public network such as the Internet. Process path D may be used, for example, when the application host 102 produces a low volume of events and the application host 102 communicates with the activity receiver back-end 110 across a local network or an internal bus.

In process path A, the log 106 stores the event (208). For example, the application host 102 or the hosted application 104 can submit event details to the log 106, and the log 106 can create a log entry with those details. Some of these logging functions can be provided by an operating system or managed code environment that executes or is provided by the application host 102. The log scanner 112 can scan local logs (210) in the log 106. In some implementations, the addition of an event to a log can create a system level event, the type to which the log scanner 112 may subscribe. Alternatively, the log scanner can poll the log 106, for example at regular intervals or when spare processing time is available, to detect new events in the log 106. The log scanner 112 reads the event information, generates an event data object that includes information about the event, and sends the event data object to the receiver front-end 128. The receiver front-end 128 can receive the event data object through an HTTP communication (212) from the log scanner 112. For example, the log scanner 112, residing in a location geographically remote from the receiver front-end 128, can send an HTTP message across the network 108 to the receiver front-end 128. The activity receiver back-end 110 can receive the event data object through a RPC communication (214) from the receiver front end 128. For example, the receiver front-end 128 can convert data from the HTTP message into the RPC format and invoke the RPC with that data. The structured data storage 114 can receive the event data object from the activity receiver back-end 110 and store the event data object (216). In some implementations, the structured data storage can have a particular query language or RPC format that may be the same as or different than the RPC format used by the activity receiver back-end 110. The activity receiver back-end 110 can translate the event data as required and can perform other checks on the event data such as sanitization and error checking. In some implementations, the structured data storage 114 can store the events in a long-term storage and can build a metadata index for the event, which may be stored in random access memory.

In process path B, the log 106 stores the event (208). For example, the application host 102 or the hosted application 104 can submit event details to the log 106, and the log 106 can create a log entry with those details. Some of these logging functions can be provided by an operating system or managed code environment that executes or is provided by the application host 102. The log scanner 112 can detect the creation of event (210) in the log 106. In some implementations, the addition of an event to a log can create a system level event, the type to which the log scanner 112 may subscribe. Alternatively, the log scanner can poll the log 106, for example at regular intervals or when spare processing time is available, to detect new events in the log 106. The log scanner 112 reads the event information, generates an event data object that includes information about the event, and sends the event data object to the receiver front-end 128. The activity receiver back-end 110 can receive the event data object through a RPC communication (214) from the log scanner 112. For example, the log scanner 112 can generate an RPC with event data from the log and invoke the RPC with that data. The structured data storage 114 can receive the event data object from the activity receiver back-end 110 and store the event data object (216). In some implementations, the structured data storage can have a particular query language or RPC format that may be the same as or different than the RPC format used by the activity receiver back-end 110. The activity receiver back-end 110 can translate the event data as required and can perform other checks on the event data, such as sanitization and error checking. In some implementations, the structured data storage 114 can store the events in a long-term storage and can build a metadata index for the event, which may be stored in random access memory.

In process path C, the receiver front-end 128 can receive the event data object through an HTTP communication (212) from the application host 102 or the hosted application 104. For example, the application host 102, residing in a location geographically remote from the receiver front-end 128, can send an HTTP message across the network 108 to the receiver front-end 128. The activity receiver back-end 110 can receive the event data object through a RPC communication (214) from the receiver front-end 128. For example, the activity receiver front-end 128 can convert data from the HTTP message into the RPC format and invoke the RPC with that data. The structured data storage 114 can receive the event data object from the activity receiver back-end 110 and store the event data object (216). In some implementations, the structured data storage can have a particular query language or RPC format that may be the same as or different than the RPC format used by the activity receiver back-end 110. The activity receiver back-end 110 can translate the event data as required and can perform other checks on the event data, such as sanitization and error checking. In some implementations, the structured data storage 114 can store the events in a long-term storage and can build a metadata index for the event which may be stored in random access memory.

In process D, the activity receiver back-end 110 can receive the event data object through a RPC communication (214) from the application host 102 or the hosted application 104. For example, the application host 102 can convert data from an event into the RPC format and invoke the RPC with that data. The structured data storage 114 can receive the event data object from the activity receiver back-end 110 and store the event data object (216). In some implementations, the structured data storage can have a particular query language or RPC format that may be the same as or different than the RPC format used by the activity receiver back-end 110. The activity receiver back-end 110 can translate the event data as required and can perform other checks on the event data, such as sanitization and error checking. In some implementations, the structured data storage 114 can store the events in a long-term storage and can build a metadata index for the event, which may be stored in random access memory.

Figure 3:
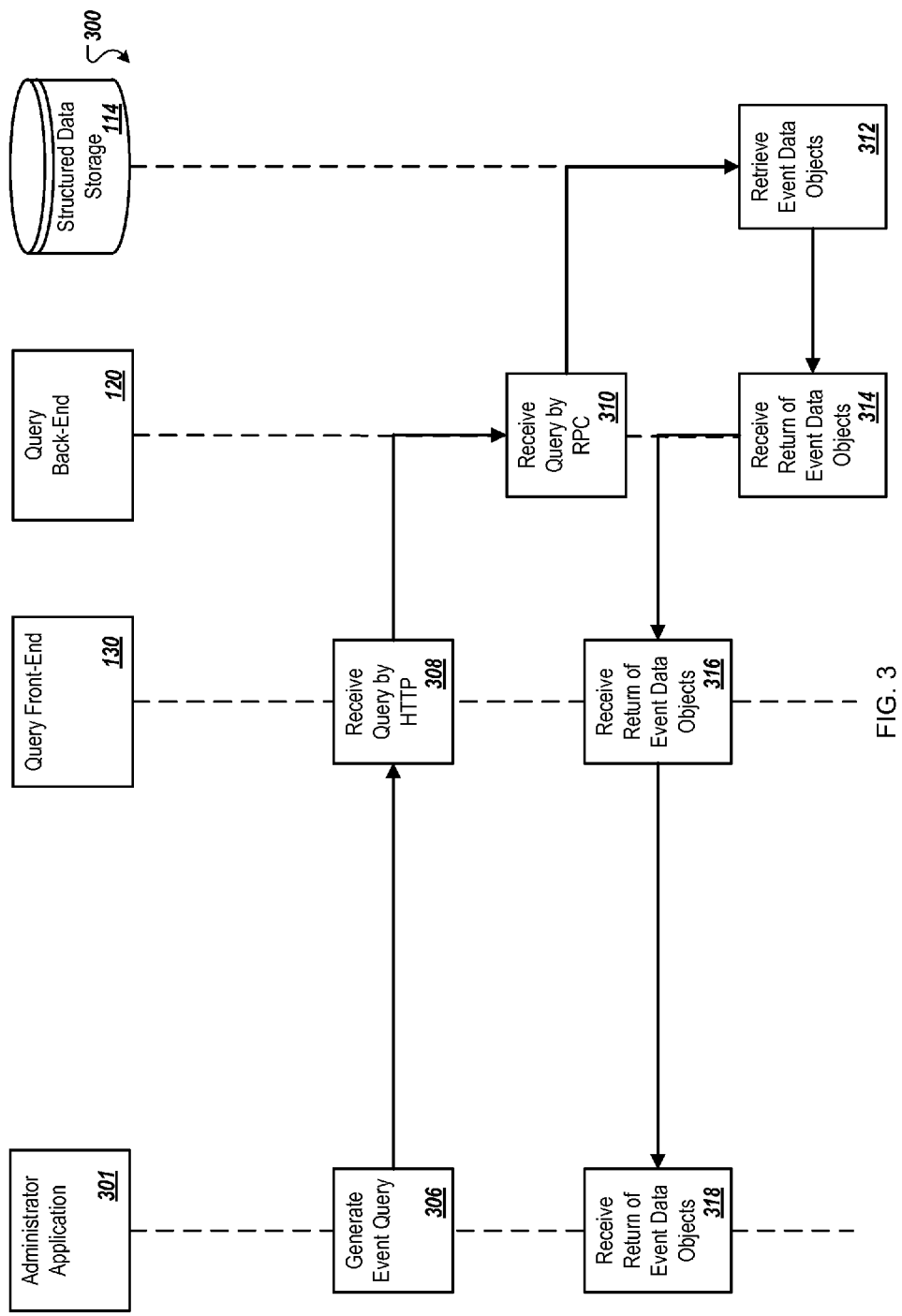
FIG. 3 is a swim-lane diagram showing an example of a process for retrieving information about events generated by hosted applications.

FIG. 3 is a swim-lane diagram showing an example of a process 300 for retrieving information about events generated by hosted applications. The process 300 can be performed by, for example, systems such as the remote event management system 126. Therefore, the description that follows uses the system 100 as the basis of an example describing the system for clarity of presentational. However, another system, or combination of systems, may be used to perform the process 300.

The administrator application 301 generates an event query (306). For example the administrator application may provide to a user a graphical user interface with controls to search, select or filter events by metadata such as user, application, domain, or event type. User input can be received and translated into a query that represents the user selections.

The query front-end 130 can receive the query through an HTTP communication (308) from the administrator application 301. For example, the administrator application 301 can generate a HTTP message that contains the generated query and can send the message across the network 108 to the query front-end 130. The query back-end 120 can receive the query through a RPC communication (310) from the query front-end 130. For example, the query front-end 130 can convert data from the HTTP message into the RPC format and invoke the RPC at the query back-end 120 with that data. The query back-end can generate a query for the structured data storage 114 from the received RPC. The structured data storage 114 can receive the query from the query back-end 120 and retrieve event data objects that meet the query requirements (312). In some implementations, the structured data storage 114 can traverse an index of metadata according to the contents of the query and identify one or more data objects that meet the query request. The structured data storage 114 can retrieve those particular data objects from long-term storage. The query back-end 120 can receive the return of the event data objects from the structured data storage (314), and the query front-end 130 can receive the return of the event data objects from the query back-end 120 (316). In some implementations, the query back-end 120 can format those event data objects into the return type of the RPC, and the query front-end 130 can format the event data for reply to the HTTP message, such as into one or more JSON objects. The administrator application 301 can receive the return of the event data objects (318) and display the event data for a user. For example, the administrator application 301 can generate one or more tables, charts, or text descriptions from the query data to aid a user in understanding the event data.

FIG. 4 is an example graphic user interface (GUI) 400 for displaying events. The GUI 400 can be generated and displayed by, for example, an administrator client device, and for descriptive purposes will be described in relation to the system 100. The GUI 400 can be displayed in a web browser with data from a template that is populated with data from event data objects generated by applications. The event data objects may be related to a particular user, a group of users, or may be all event data objects a particular user has access permission to view.

In the user control 404, the "Audit Log" option 405 has been selected, and user interface elements are displayed below to provide information and receive user input related to event data objects that are stored in the structured data storage 114.

User controls 406 can provide functionality to manage the display and handling of events in the GUI 400. For example, a filtering options dropdown box 407 can provide functionality to filter the events that are displayed. An export dropdown box 409 can provide functionality to export the displayed events to a file.

An event listings 408 can display a grid of event information, with one event per row. For each event, an event type can be displayed in a column 410. The event type can describe the type of event being displayed, according to a per-application, per-domain, per-host, or universal listing scheme. For example, "Organization" type events may be an application specific event type for an organization application or an application that tracks organizations. "User" type events may be universal events related to any addition, deletion, or change to a user, such as users tracked by an authentication system. Some example event types can include "expense_report_approved," "employee_account credited," and "disk_quota_exceeded."

Event actions can be displayed in a column 412. The event action listing may be a human readable conversion of data fields in an event data object. A template action string can be populated with the data fields, with the data in the data fields underlined. For example, a template string "<oldname> renamed <newname> in <location>" can be populated, as shown in the bottom row, with "johnd," "johnc," and "Tokyo" to display as "johnd renamed johnc in Tokyo." In some implementations, the underlined text may assist a human reader to quickly and accurately understand which text comes from event data fields and which text is part of a template string.

Users for each event can be displayed in a column 414. In some implementations, the administrator may be a user that caused the creation of an event, or may be the user that owns and may modify an event. A time stamp for each event can be displayed in a column 416. The timestamp can include both the date and the time, and may be formatted to the local time.

Figure 5:
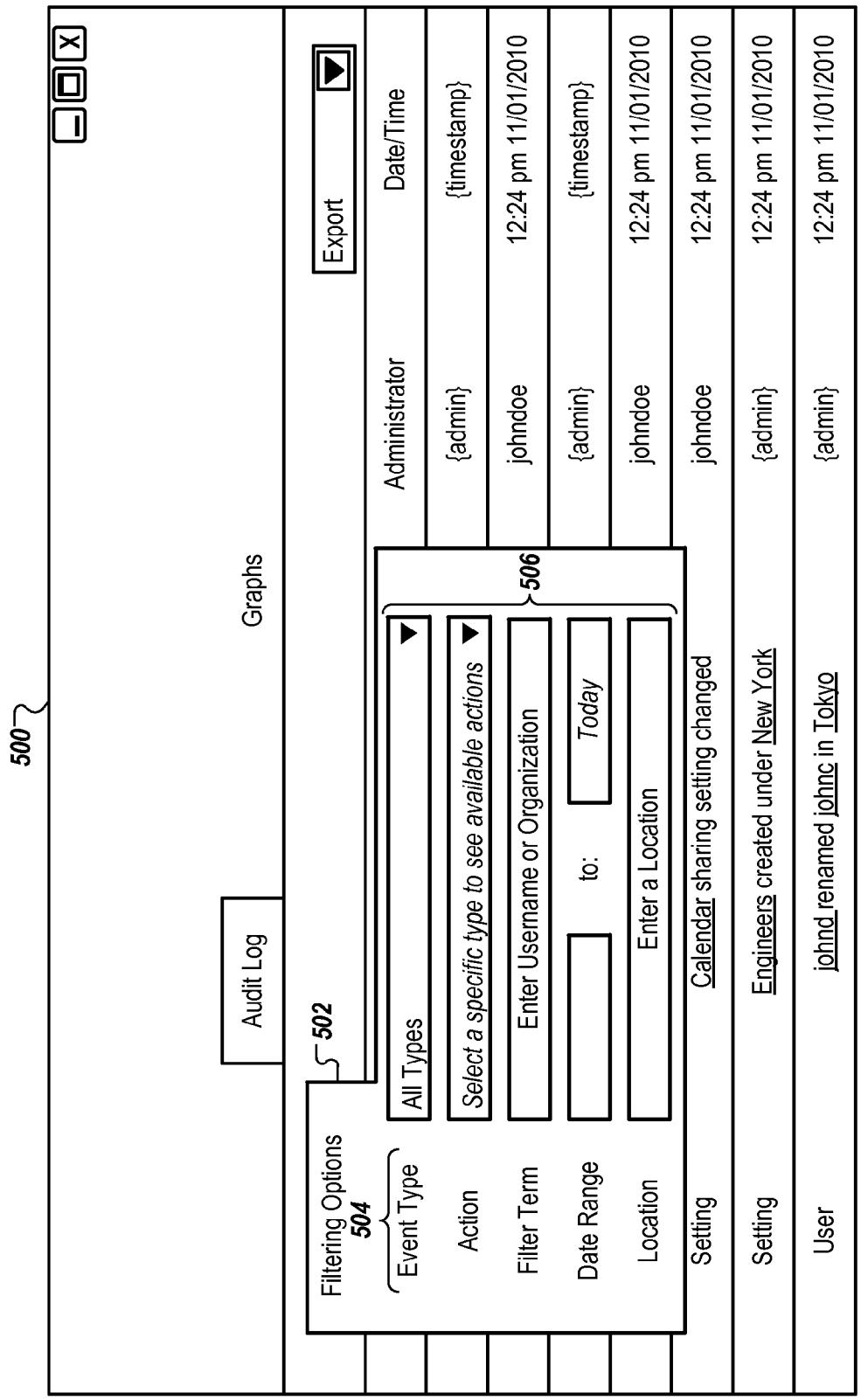
FIG. 5 is an illustration showing an example of a graphical user interface for filtering events.

FIG. 5 is an illustration showing an example of a graphical user interface (GUI) 500 for filtering displayed events. The GUI 500 can be generated and displayed on, for example, an administration client device, and for descriptive purposes will be described in relation to the system 100. The GUI 500 can be displayed in a web browser with data from a template that is populated with data from event data objects generated by applications. The GUI 500 can be generated, for example, in response to user selection of the filter options drop down box 407 in the user control 406 of the GUI 400.

Window 502 can display filter options for data displayed in the GUI 500. The window 502 may dynamically expand to fit the size of the contents of the window 502, and may be displayed over other content of the GUI 500.

Filter fields 504 list some or all of the fields of the events loaded in the GUI 500. In this example, four field types are listed, "Event Type," "Action," "Filter Term," "Data Range," and "Location." In some implementations, these four fields may exist for all event objects and may be displayed in the window 502 for any events, however more or fewer of these universal data fields are possible. Other event types may have application or domain specific data fields, in which case those data fields may be listed under the illustrated data fields in the window 502.

User controls 506 can receive user input for some or all of the data fields 504. The type of user control can depend on the type of data to be entered. For the "Event Type" field, a dropdown box is displayed to allow a user to select from a finite list of event types. In some implementations, each hosted application can define a list of event types, which may or may not include some universal events defined by the remote event management system 126. For the "Action" field, a dropdown box is displayed to allow a user to select a particular action for a particular event type. For example, for a collaborative document, "share" events may record any event where a user is added or removed from the document. Possible "share" type actions might include "add user,"

"remove user," "add user as observer" and "transfer ownership." For the "Filter Term" field, a text box is displayed to allow a user to search event text and/or event identity for a particular term or search string. For the "Data Range' field, a data input control is displayed to allow a user to specify a data or data range to filter. For other event types, other input control types are possible. For the "Location" field, a text box is displayed to allow a user to search for events generated by a user in a geographic location.

In some implementations, when a user selects one or more filter options in the window 502, the GUI 400 is reloaded. The event listings 408 can be filtered and/or sorted according to the selections in the window 502, and if more or different filtering is desired by a user, selection of the filter options user control 406 can reload the GUI 500.

Figure 6:
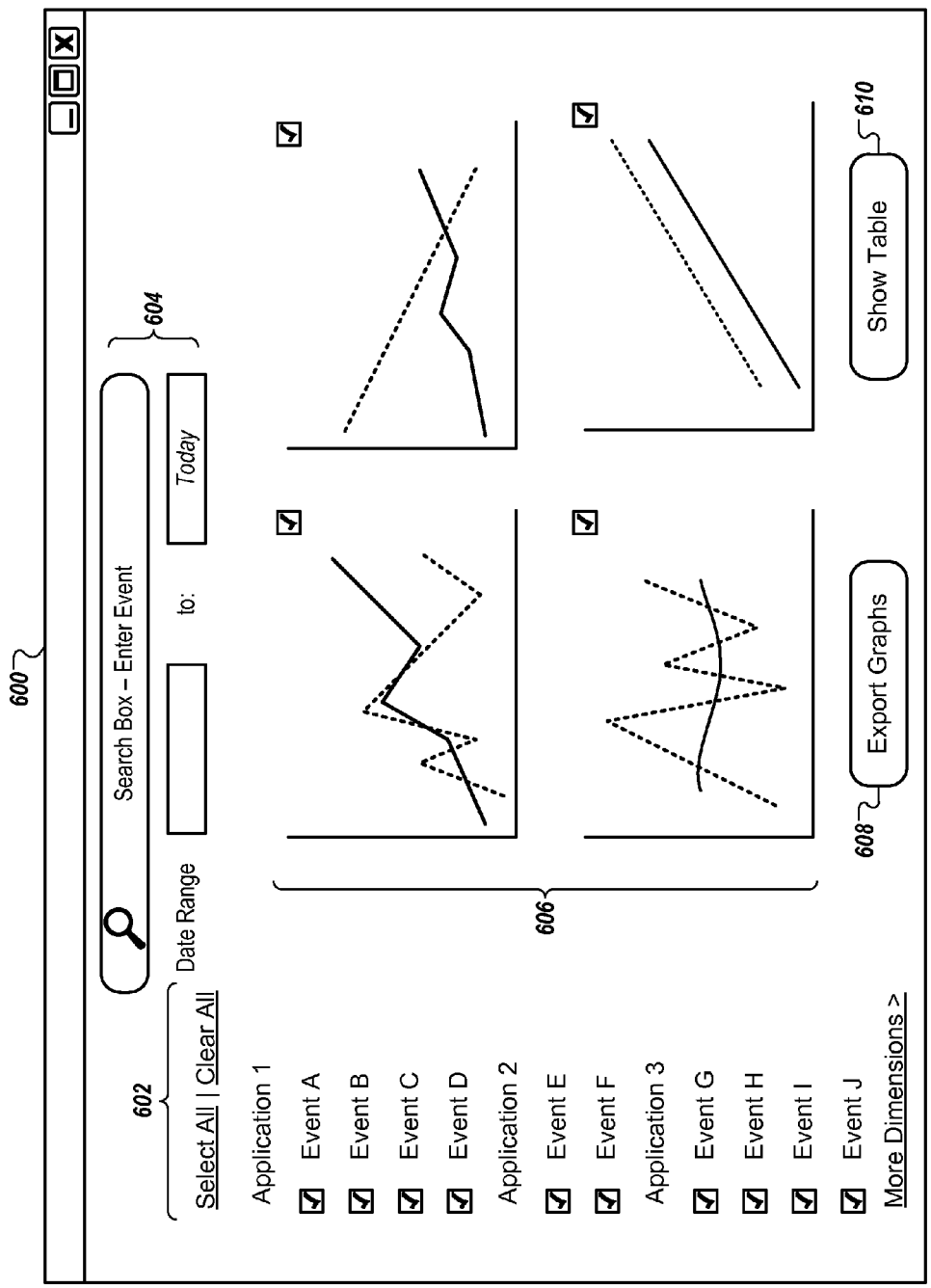
FIG. 6 is an illustration showing an example of a graphic user interface for displaying graphs of events.

FIG. 6 is an illustration showing an example of a GUI 600 for displaying graphs of event data, which can be used to display event trends. The GUI 600 can be generated and displayed on, for example, the client device 105, and for descriptive purposes will be described in relation to the system 100. The GUI 600 can be displayed in a web browser with data from a template that is populated with data from event data objects generated by applications. The GUI 600 can be generated, for example, in response to user selection of the "Graphs" option 411 in the user control 404 of the GUI 400.

User controls 602 and 604 can provide functionality to select the types of event data to aggregate and display in graphs 606. The user control 602 can show a list of applications and check boxes for each event type in the applications. In response to a user selection of an event type check box, those events can be added or removed from display in the graphs 606.

User control 604 can receive filter values for some or all of the fields of events selected in the user control 602 to further filter those user selections. In this example, an event search field and data fields can be used to filter based on keyword and timestamp, but other filter options are possible, including but not limited to those described in the GUI 500.

The graphs 606 can display aggregate information of the events selected in the user controls 602 and 604. Some line graphs can be configured to show the number of events occurring over a period of time, for example login events per day. Another line graph can be configured to show a subset of those login events per time, for example login events in a particular country, or login events where a given parameter (e.g. "employee_org") has a given value (e.g. "engineering.") In addition to line graphs as shown, other forms of data presentation can be shown, such as bar charts, heat maps, animation, spark lines, or any other appropriate form of data visualization. In some implementations, each graph 606 can be associated with different selection criteria. For example, in response to user selection of one of the graphs 606, the selection criteria for the graph can be loaded into the user controls 602 and 604 where a user can edit the selection criteria to change the selected graph 606. In response to user selection of a second of the graphs 606, the selection criteria of the first graph can be removed from the user controls 602 and 604 to be replaced with the second graph's 606 selection criteria.

A button 608, when clicked, can export one or more of the graphs to the remote user terminal as one or more files saved to disk. The graphs 606 can include a checkbox to allow user input to select one or more of the graphs 606 for export. When export is initiated, the GUI 600 can create a dialog box to receive user input specifying the format and location of the exported files. For example, the dialog box can request a file name, format and location. Additionally, the dialog box may permit the user to export the graphs to a single file or a collection of files, such as one file per graph.

A button 610, when clicked, can load the GUI 400 filtered with selection criteria in the user controls 602 and 604.

Figure 7:
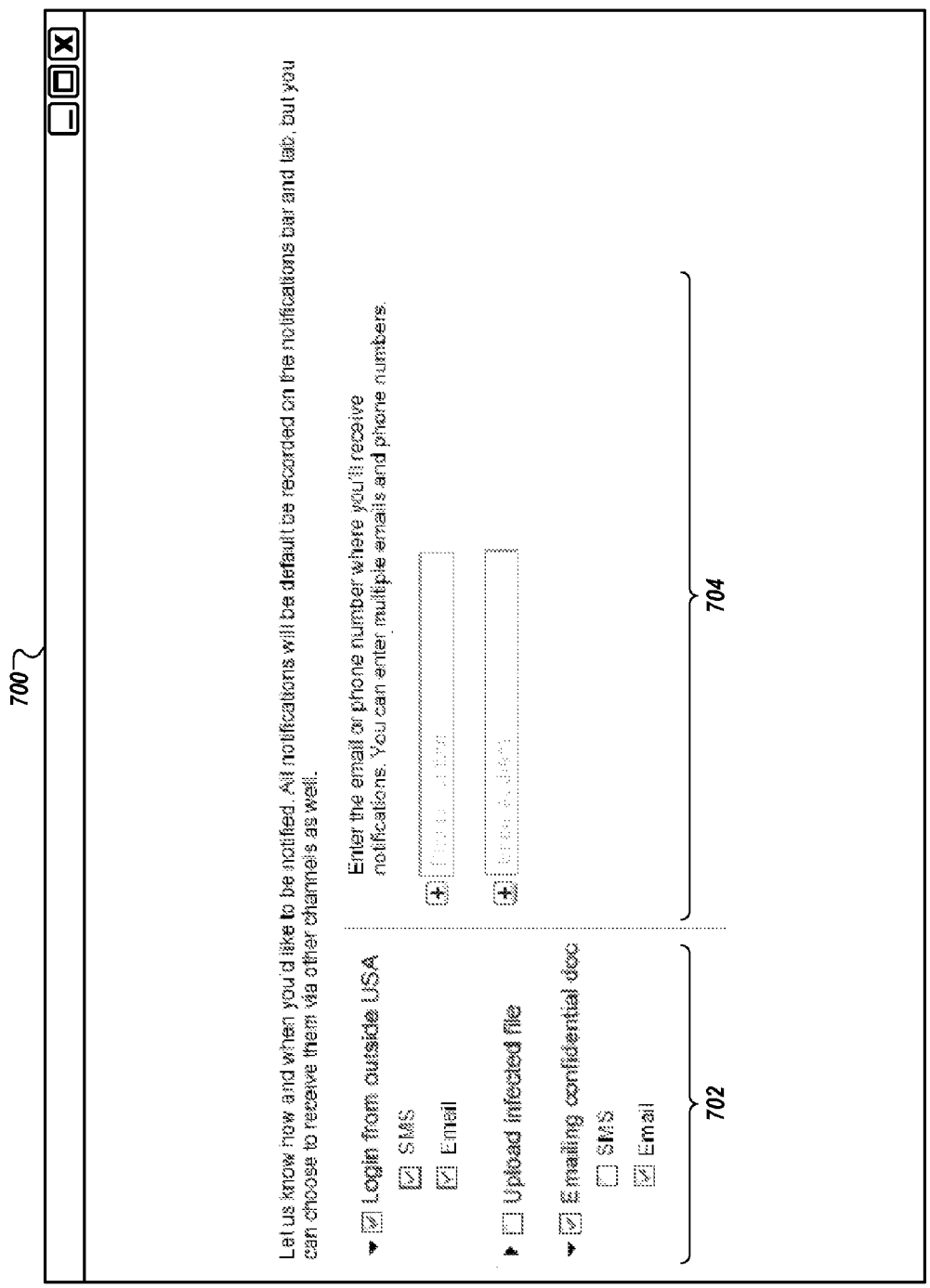
FIG. 7 is an illustration showing an example of a graphic user interface for registering event notifications.

FIG. 7 is an illustration showing an example of a GUI 700 for registering event notifications. The GUI 700 can be generated and displayed by, for example, an administrator client device, and for descriptive purposes will be described in relation to the system 100. The GUI 700 can be displayed in a web browser with data from a template that is populated with data from monitoring queries used in the system 100. The GUI 700 can be generated, for example, in response to user selection of the "Alerts" option 413 in the user control 404 of the GUI 400.

User controls 702 can provide functionality to enable one or more alerts to be created by the event management system 126. Three alert types are listed in the user control 702: "Login from outside USA", "upload infected file", and "emailing confidential documents," although other alert types are possible. As described above, these alerts can be associated with monitoring queries that can be processed by the monitoring query engine 132 to create alert messages in response to an alert condition. A checkbox by each alert type can enable that alert for the user using the GUI 700. For example, a check in the checkbox by "Login from outside USA" can enable alerts for the user anytime a user in the enterprises tries to or succeeds in logging into a hosted application from outside of the United States. If an alert is enabled, one or more communication channels can be selected for that alert. For example, SMS (for Simple Message Service text messages) and Email communication channels can be presented with associated check boxes, and a check in those checkboxes enables those communication channels for that alert for the user.

User controls 704 can provide functionality to receive contact information for a user. Text fields can accept one or more phone numbers and email addresses, but other contact information is possible. For example, an URI can be received in a text field, and alert data files can be uploaded to the URI so that the user has a permanent records of alerts that are machine readable. This contact information can be used when transmitting alert messages associated with the related communication channel.

FIG. 8 shows an example of a computing device 800 and a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate.

The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a microdrive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require that the particular order show, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method comprising:
receiving, at a server system, event data that was sent over a network to the server system, the event data reflecting one or more application events generated by at least one hosted application, the hosted application being executed on one or more servers and being accessible by a user over a network using a user client device, wherein the application events are associated with an enterprise, and wherein the application events are generated as a result of the user associated with the enterprise interacting with the hosted application;
storing the event data at the server system, comprising:
storing the event data in association with the user; and
storing the event data in association with the enterprise;
receiving, at the server system and from an administrator client device over a network, a request to view information regarding events generated by the hosted application, wherein the information regarding the events generated by the hosted application includes information regarding application events associated with the enterprise;
retrieving the stored event data including the event data stored in association with the enterprise; and
causing, at the administrator client device and based on the retrieved event data, a display of information regarding application events associated with the enterprise and generated by the hosted application.

2. The method of claim 1, wherein the application events are generated by multiple hosted applications that are associated with the enterprise.

3. The method of claim 1 wherein:
the application events are associated with a domain registered with the server system;
storing the event data comprises storing the event data in association with the domain;
receiving, at the server system and from the administrator client device over a network, the request to view information regarding events generated by the hosted application comprises receiving a request to view information regarding events associated with the domain;
retrieving the stored event data comprises retrieving event data stored in association with the domain; and
causing, at the administrator client device and based on the retrieved event data, a display of information regarding events generated by the hosted application comprises causing a display of information regarding events associated with the domain.

4. The method of claim 1 wherein the events are generated in response to a change of state of the hosted application.

5. The method of claim 4 wherein the change in state is a result of user interaction with the hosted application.

6. The method of claim 1 further comprising enabling a user of the administrator client device to filter the display of information regarding application events based on attributes of the application events.

7. The method of claim 6 wherein the attributes include one or more of event type, identity of event, location of user that caused event to occur, time event occurred, or a keyword related to events.

8. The method of claim 1 further comprising enabling a user of the administrator client device to configure alerts based on patterns of application events.

9. The method of claim 8 wherein one of the patterns include access to the hosted application from outside a particular geography.

10. The method of claim 1 further comprising enabling a user of the administrator client device to display event trends based on the event data.

11. The method of claim 1 wherein the display of information regarding application events generated by the hosted application comprises a graph showing event trends.

12. The method of claim 11 wherein the graph showing event trends comprise a graph showing a number of selected application events occurring over a period of time.

13. A system comprising:
an application host configured to execute a hosted application that is accessible by a client system over a network and that generates application events, wherein the application events are associated with an enterprise;
a user client device configured to access the hosted application over the network;
an event management server system configured to:
receive event data that was sent over a network to the event management server system, the event data reflecting one or more application events generated by the hosted application;
store the event data including the event data in association with the enterprise;
receive, from an administrator client device over a network, a request to view information regarding events generated by the hosted application, wherein the information regarding the events generated by the hosted application includes information regarding application events associated with the enterprise;
retrieve the stored event data including the event data stored in association with the enterprise; and
cause, at the administrator client device and based on the retrieved event data, a display of information regarding application events generated by the hosted application; and
the administrator client device configured to send, to the event managements system over the network, the request to view information regarding events generated by the hosted application and to display the information regarding application events associated with the enterprise and generated by the hosted application.

14. The system of claim 13, wherein the application events are generated by multiple hosted applications that are associated with the enterprise.

15. The system of claim 13, wherein:
the application events are generated as a result of the user interacting with the hosted application, wherein the user is associated with the enterprise; and
the event management server system is configured to store the event data in association with the user.

16. The system of claim 13 wherein:
the application events are associated with a domain registered with the event management server system; and
the event management server system is configured to:
store the event data in association with the domain;
receiving, from the administrator client device over a network, a request to view information regarding events associated with the domain;
retrieve event data stored in association with the domain; and
cause, at the administrator client device and based on the retrieved event data, a display of information regarding events associated with the domain.

17. The system of claim 13 wherein the events are generated in response to a change of state of the hosted application.

18. The system of claim 17 wherein the change in state is a result of user interaction with the hosted application.

19. The system of claim 13 wherein the administrator client device is configured to allow a user of the administrator client device to filter the display of information regarding application events based on attributes of the application events.

20. The system of claim 19 wherein the attributes include one or more of event type, identity of event, location of user that caused event to occur, time event occurred, or a keyword related to events.

21. The system of claim 13 wherein the event management server system is configured to enable a user of the administrator client device to configure alerts based on patterns of application events.

22. The system of claim 21 wherein one of the patterns include access to the hosted application from outside a particular geography.

23. The system of claim 13 wherein the administrator client device is configured to allow a user of the administrator client device to display event trends based on the event data.

24. The system of claim 13 wherein the display of information regarding application events generated by the hosted application comprises a graph showing event trends.

25. The system of claim 24 wherein the graph showing event trends comprise a graph showing a number of selected application events occurring over a period of time.

26. A method comprising:
receiving, at a server system, event data representing one or more application events generated by multiple hosted applications that are associated with an enterprise, the hosted applications being executed on one or more servers and being accessible by a user device, wherein the one or more application events are associated with a domain registered with the server system;

storing the event data representing the one or more application events associated with the domain;

receiving, at the server system and from an administrator device over a network, a request to view information regarding application events associated with the domain and generated by one or more of the multiple hosted applications that are associated with the enterprise;

retrieving the stored event data representing the one or more application events associated with the domain; and in response to receiving the request, causing, at the administrator device, a display of information regarding the application events associated with the domain generated by the one or more of the multiple hosted applications that are associated with the enterprise.

27. A system comprising:

an application host configured to execute a hosted application that is accessible by a client system over a network and that generates application events, wherein the application events are associated with a domain registered with an event management server system;

the event management server system configured to:

receive event data that was sent over a network to the event management server system, the event data reflecting one or more application events generated by the hosted application;

store the event data in association with the domain;

receive, from an administrator client device over a network, a request to view information regarding events associated with the domain;

retrieve the stored event data in association with the domain; and cause, at the administrator client device and based on the retrieved event data, a display of information regarding application events associated with the domain and generated by the hosted application; and the administrator client device configured to send, to the event managements system over the network, the request to view information regarding events generated by the hosted application and to display the information regarding application events associated with the domain.

28. The system of claim 27, wherein the application events are generated by multiple hosted applications that are associated with an enterprise.

29. The system of claim 27, wherein:

the application events are generated as a result of a user interacting with the hosted application, wherein the user is associated with an enterprise; and the event management server system is configured to store the event data in association with the user.

* * * * *